Patented Aug. 17, 1937

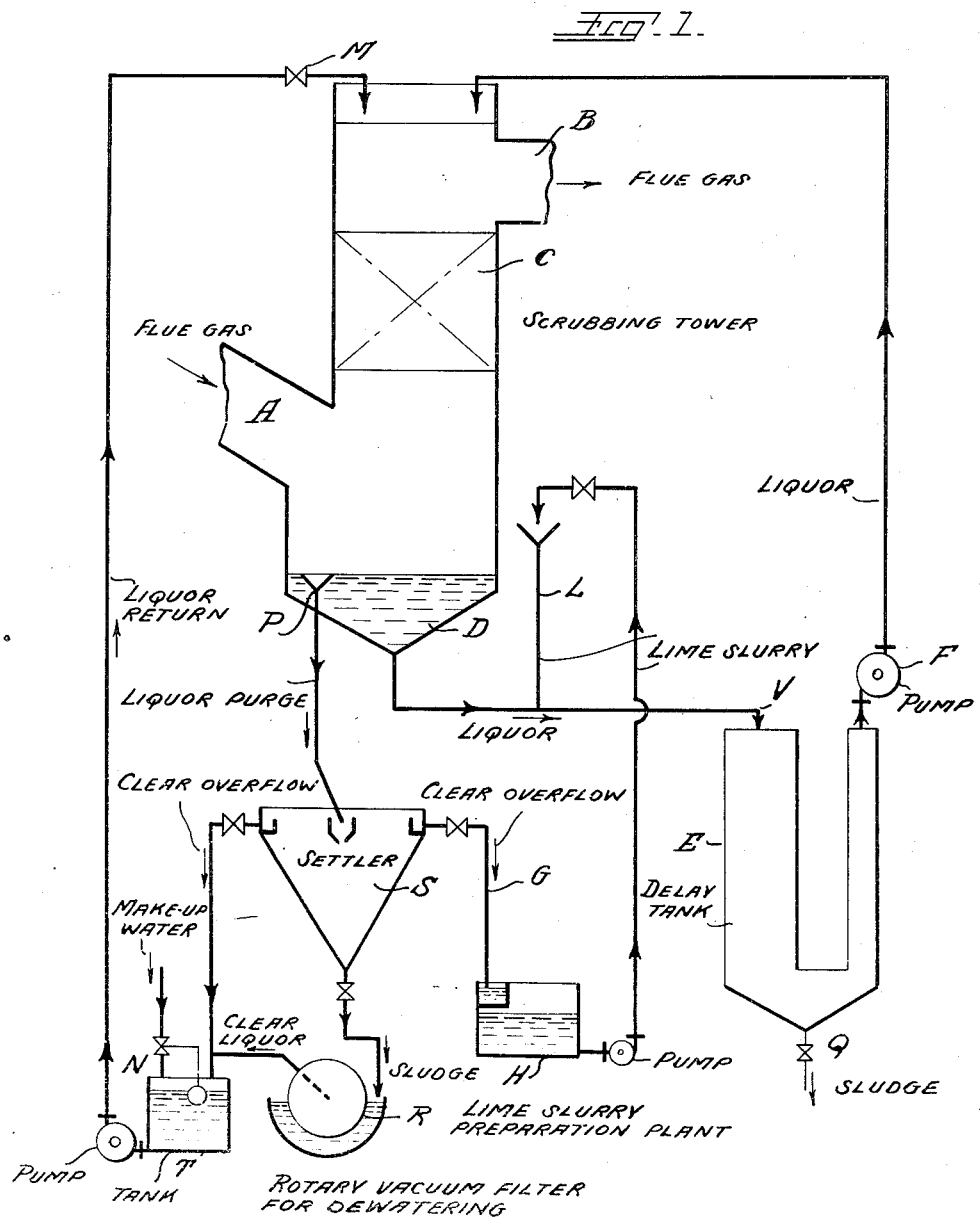

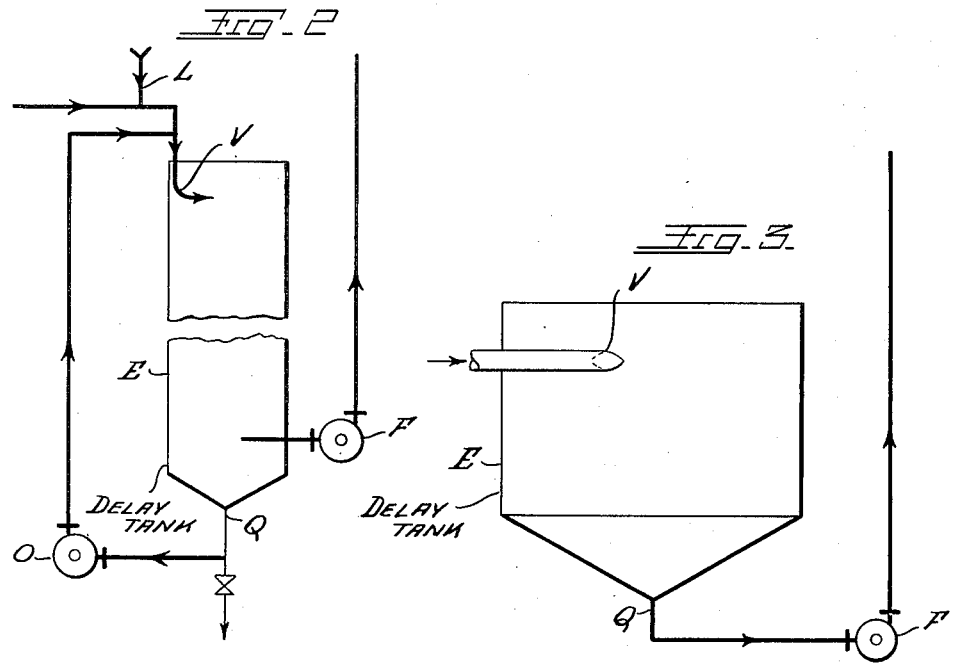
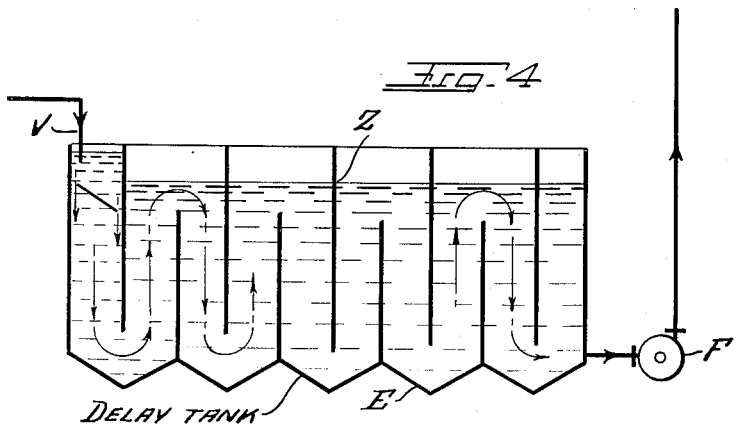

2,090,142

UNITED STATES PATENT OFFICE 2,090,142

WET PURIFICATION OF GASES

Gordon Nonhebel and John Lindon Pearson, Norton-on-Tees, England, assignors to Imperial Chemical Industries Limited, a corporation of Great Britain Application December 27, 1934, Serial No. 759,397
In Great Britain December 28, 1933

3 Claims. (Cl. 23—2)

This invention relates to the wet purification of gases, in particular waste flue gases for the removal of oxides of sulphur, and any smoke and ash present, by scrubbing such gases with re-circulated aqueous washing media in a system in which lime or chalk is continuously added in amount approximately equivalent to the absorbed sulphur oxides and in which the insoluble solids collecting in the system, principally ash, calcium sulphite and calcium sulphate, are removed by purging off a part only of the recirculating liquor.

The present invention is concerned with the prevention of scaling upon the surfaces of the scrubber, which presents a serious problem when lime, chalk, or an alkali such as magnesian limestone which contains lime is added to the system. In the description here given the word lime is to be taken to mean any of these substances, that is, it is to be understood as generic to all of them.

In any scrubbing system of the type described, the liquor entering the scrubber is saturated or nearly saturated with calcium sulphite and sulphate, and contains suspended calcium carbonate and dissolved bicarbonate. If the make-up water added to replace losses in the recirculating system due to evaporation and due to losses with the rejected mud is relatively small, the recirculating liquor will eventually become saturated or supersaturated with respect to calcium sulphite and sulphate during passage through the scrubber. This is particularly the case when the above-mentioned purge is clarified in a settler or similar apparatus and when the liquor so clarified is returned to the recirculating system.

Calcium sulphite and sulphate readily form supersaturated solutions and it is found that the liquor leaving the scrubber is supersaturated with respect to these salts when the amount thereof formed in the scrubber is in excess of the amount required to saturate the make-up water. Moreover, when the lime is added to the recirculating liquor the pH of the solution is raised and this increase in pH lowers the solubility of the calcium sulphite in the liquor, with the result that the solution may become supersaturated with respect to this salt even in cases when the decrease in pH in the scrubber itself so increases the solubility of calcium sulphite that no saturation or supersaturation with respect to this salt occurs within the scrubber.

It is known that supersaturation can be prevented by seeding with crystals of the salt with respect to which the solution is supersaturated, or with crystals of an isomorphous salt. We have found, however, that in a gas purification process of the type described supersaturation can occur at the base of the scrubber and cause scaling of the scrubbing surfaces in a normal scrubbing system of relatively small total liquor capacity, even when the solids retained in the recirculating liquor system are sufficient to give concentrations of suspended calcium sulphite and sulphate of over 5% each. Moreover, in practice, there is a limit to the quantity of suspended solids which may be carried in the liquor, especially through the scrubber.

According to the present invention, in a process of the type described, deposition of the scale on the surfaces inside the scrubber due to crystallization of calcium sulphite and sulphate is substantially prevented by treating the liquor after leaving the scrubber so as to remove practically the whole of the supersaturation of the liquor due to calcium sulphite and sulphate, before recirculating it over the scrubbing surfaces. The said treatment of the liquor from the scrubber preferably consists in delaying the return of the liquor to the scrubber for a definite minimum time, hereinafter referred to as delay time, to enable desupersaturation of the liquor by crystallization of the reaction products to be substantially completed. In this manner the building up of a highly supersaturated solution during constant recirculation of the liquor is avoided.

Special means for oxidizing calcium sulphite to calcium sulphate may be employed, but these are not essential because considerable oxidation usually occurs in the scrubber itself as a result of excess oxygen in the flue gases and adventitious catalysts in the scrubbing liquor.

In order to carry out our invention, we include a large liquor capacity, hereinafter referred to as the delay tank, in the system, which is much greater than that required to fill normal sized pumping tanks, pipes, hoppers and feed tanks. This capacity may be incorporated anywhere in the system, e. g. by enlarging the pumping tank or pipes, but preferably the delay tank is a separate vessel which is placed immediately after the point of addition of the lime. The lime is preferably added to the liquor immediately after it leaves the scrubber so as to assist the precipitation of calcium sulphite in the delay tank.

The size of the delay tank is calculated to interpose such a liquor capacity between the scrubber exit and scrubber inlet as is required to give the delay time calculated as shown hereinafter.

The delay time required is calculated (1) For calcium sulphate, from the normal time taken for the main body of liquor leaving the bottom scrubbing elements to return to the top scrubbing elements;

(2) For calcium sulphite, from the time taken for the main body of liquor to pass from the point of lime addition to the top scrubbing elements.

The delay time required varies principally with functions of (1) The extent of supersaturation to be removed.

(2) The inverse of concentration of suspended seeding crystals in the liquor in the delay tank.

It also varies to a lesser degree with (3) The inverse of the concentration of non-isomorphic material in suspension.

(4) The inverse of the total ionic strength of the solution.

(5) The inverse of the temperature.

In calculating the delay time required for a particular scrubber the last two factors are usually fixed. The concentration of suspended solids in the liquor is also limited for practical reasons, but it is in practice possible to carry at least 3% each of suspended calcium sulphite and sulphate in the liquor even when scrubbing gas high in dust content, such as flue gas from a powdered fuel boiler. It is necessary, however, to carry out small scale experiments under precisely the conditions of operation on the full scale to determine the proportions of calcium sulphite and sulphate formed in the scrubbing system, since the extent of the oxidation of the calcium sulphite to calcium sulphate varies with the oxygen content of the flue gas, the design and material of the scrubber packing and the oxidation catalysts accidentally present in the recirculating liquor. It is then possible to calculate the make of calcium sulphite and sulphate during each passage of the liquor through the scrubber from the ratio of liquor and gas rates, and the composition of the gas. Owing to the slowness of desupersaturation, the magnitude of the supersaturation of the liquor at the scrubber exit is nearly equal to this make.

In general, with an average make-up water derived from a stream or canal, the circulating liquor becomes concentrated by evaporation and by absorption of hydrochloric acid from the flue gases to such an extent that its total ionic strength becomes substantially equal to that of sea water saturated with calcium sulphate and sulphite. With sea water make-up, the total ionic strength naturally becomes much greater at equilibrium. The usual temperature attained when scrubbing boiler flue gas is 50°±5° C.

The delay time required, with concentrations of at least 3% each of suspended calcium sulphate and sulphite and with average make-up water and with a circulating liquor temperature of 50°±5° C., is for calcium sulphate approximately one minute for each milligram equivalent per litre increase in calcium sulphate content per passage of the circulating liquor through the scrubber. With coal containing 2% of sulphur and 50% oxidation of sulphite to sulphate, this increase is approximately 3–4 mg. equiv./litre, and therefore the delay time required would be of the order of 3–4 minutes. The delay time for calcium sulphite is in general substantially less, and is only about half a minute per mg. equiv./litre increase in calcium sulphite make per passage of the circulating liquor. With coal containing 2% of sulphur and 50% oxidation of sulphite to sulphate, this increase is 1.5–2 mg. equivs./litre and the delay time required would therefore be of the order of 1.5–2 minutes. It will therefore be seen that the choice of the delay time to allow for complete crystallization of the calcium sulphate allows in this case adequately for the crystallization of the sulphite. In some cases, however, for example with coals containing 4–5% sulphur and in processes where the oxidation catalysts are relatively ineffective, the make of calcium sulphite may be the controlling factor, and this will be revealed by the previously mentioned small scale experiment.

We have found that in general a separate oxidizer is only an advantage when dealing with coal having an exceptionally high sulphur content, e. g. greater than 4 per cent. In these circumstances the oxidizer may be suitably proportioned or operated to control the conversion of dissolved sulphite to sulphate, so that the delay time necessary for the precipitation of the sulphite may be the same as for the sulphate. Since the lime must be added after the oxidizer it is advantageous to divide the increased capacity necessary according to the present invention so that part of the delay time occurs between the scrubber exit and the oxidizer and the remainder after the oxidizer.

With increase in the concentration of suspended calcium sulphite and sulphate very little decrease in the delay time is possible, and such decrease is of the order of 10% for 6% each of suspended calcium sulphite and sulphate. With decrease in the concentration of suspended calcium sulphite and sulphate the delay time is very substantially increased and may be nearly double for 2% each of suspended calcium sulphate and sulphite.

It is to be noted that in industrial plants the delay time for calcium sulphate is substantially greater than the time taken to desupersaturate a supersaturated solution of this salt in the laboratory with finely divided crystals of gypsum. This is probably due to the impure state and dirty surface of the crystals, which is inevitable in an industrial plant.

In carrying out the invention, it is essential that there should be a uniform flow of liquor through the delay tank and a minimum of by-passing. We therefore prefer either to arrange the delay tank in the form of a long pipe, which may take the form of a U tube, or to pass the liquor tangentially into the top of a cylindrical tank and withdraw it at the centre of the bottom of this tank. The U tube type of delay tank is particularly useful in plants where the scrubber is on an upper floor of the building and in which it is desired to support the heavy tank on the ground.

In another form of the invention where, for example, the dust concentration in the flue gases is so high that it is undesirable to pass liquor containing a very high proportion of suspended solids through the scrubber, we arrange the delay tank as an elutriator or partial settler and withdraw from its base solution high in suspended solids which we then return to the top of the delay tank. The liquor flowing to the scrubber may also be passed through a liquor cyclone or settler or similar apparatus for the reduction of its content of suspended solids and the part of the suspended solids which it is not required to reject from the system may be returned to the delay tank.

The accompanying diagrams illustrate examples of the arrangement of the delay tank in a boiler flue gas scrubber system.

Figure I shows diagrammatically a general arrangement of a complete plant, and illustrates a preferred method of working the plant according to our invention when the scrubber is near the roof of the building. It shows also a delay tank of the unsymmetrical U type. The flue gas enters the scrubbing tower C at A and leaves at B. The liquor leaving the scrubber hopper D passes into the delay tank E (at V) from which it is returned to the system by the pump F. This arrangement comprises the main recirculation liquor system.

In order to remove accumulated solids, a portion of the liquor leaving the scrubber is purged off at the overflow pipe P to the settler S. A part of the clear overflow from this settler passes to the tank T and part is used for mixing the lime slurry. The sludge from the settler is dewatered on a rotary vacuum filter R, and the clear liquor collected also in the tank T. The water level in the tank T is maintained constant by addition of make-up water through a float operated valve N. The total rate of purge may therefore be controlled by variation in the supply of returned liquor at the valve M.

Part of the clear settled or filtered liquor is passed by the line G to a lime slurry preparation plant H. This lime slurry is added to the circulating liquor system at L before the delay tank E. In order to hasten desupersaturation, it is preferable to use only clarified liquor which is already saturated with calcium sulphate and sulphite for the preparation of the lime slurry, and to use as thick a slurry as is practicable whilst ensuring complete mixing at the point of addition to the recirculating liquor system. Moreover, it is preferable to add the make-up water and the residual clarified liquor to the liquor after the delay tank, in order that any residual supersaturation left after the delay tank may be reduced or removed by the dilution effected by the make-up water. Any sludge settling in the delay tank may be removed at the sludge point Q.

Figure II shows a tall and wide delay tank which is a variant of that shown in Fig. I. In this case the circulating liquor pump F is placed near the bottom of the delay tank, and the delay tank may also be designed as a partial settler. The thick sludge collecting in this delay tank may be recirculated from the sludge point Q by the pump O back to the top of the delay tank in order to retain a higher concentration of suspended solids in the liquor in the tank than in the liquor passing over the scrubbing elements so as to ensure more rapid de-supersaturation. In order to ensure the maximum delay time in a tank of this shape, the liquor is fed into the top tangentially at V so as to impart a rotatory motion to the liquid and prevent direct short circuiting to the outlet.

Figure III shows an ordinary cylindrical squat delay tank in which the liquor is fed in tangentially at the top at V and withdrawn at the centre of the bottom at Q, in order to prevent short circuiting.

Figure IV shows a rectangular delay tank fitted with baffles Z to ensure the maximum average delay time for the liquor and the minimum of settling.

We claim:

1. In the purification of gases resulting from the combustion of sulphur-containing fuel by treatment with washing liquor recirculated in a system of the non-effluent type, the process which comprises establishing flow of an aqueous washing liquor in a circuit which includes a gas-scrubbing zone, said liquor containing lime when it enters said gas-scrubbing zone as well as being substantially saturated with calcium sulphite and calcium sulphate, said liquor throughout said circuit carrying in suspension a substantial predetermined minimum percentage of solid calcium sulphite and calcium sulphate, conducting the gas to be purified in scrubbing contact with the washing liquor as it flows through said gas-scrubbing zone, whereby the washing liquor absorbs sulphur oxides from the gas with formation of calcium sulphite and calcium sulphate and becomes supersaturated with respect at least to calcium sulphate, adding lime to the washing liquor, after it leaves the gas-scrubbing zone, in quantity approximately equivalent to the newly formed calcium sulphite and calcium sulphate, then delaying return of the liquor to the gas-scrubbing zone, while maintaining its content of suspended calcium sulphite and calcium sulphate at not substantially less than said predetermined minimum percentage, for a period of time sufficiently long to ensure substantially complete de-supersaturation thereof, and removing solid matter from the liquor at a locality outside the gas-scrubbing zone and at a rate substantially approximating the rate of make of calcium sulphite and calcium sulphate and of ash accumulation in said zone.

2. The process as defined in claim 1, wherein the predetermined minimum quantity of solid calcium sulphite and calcium sulphate maintained in suspension amounts to not substantially less than 3 per cent of each.

3. The process as defined in claim 1, wherein the predetermined minimum quantity of solid calcium sulphite and calcium sulphate maintained in suspension amounts to not substantially less than 3 per cent of each, and wherein the lime content of the washing liquor entering the gas-scrubbing zone is in the form of suspended calcium carbonate and dissolved calcium bicarbonate.

GORDON NONHEBEL.
JOHN LINDON PEARSON.